(12) United States Patent
Park

(10) Patent No.: US 6,505,398 B2
(45) Date of Patent: Jan. 14, 2003

(54) VERY HIGH PRESSURE MINIATURE SENSING AND MOUNTING TECHNIQUE

(75) Inventor: Kyong M. Park, Westlake Village, CA (US)

(73) Assignee: Kavlico Corporation, Moorpark, CA (US)

(*) Notice: Subject to any disclaimer, the term of this patent is extended or adjusted under 35 U.S.C. 154(b) by 115 days.

(21) Appl. No.: 09/729,044

(22) Filed: Dec. 4, 2000

(65) Prior Publication Data

US 2002/0073533 A1 Jun. 20, 2002

(51) Int. Cl.[7] ................................................. H01S 4/00
(52) U.S. Cl. ........................... 29/825; 29/592.1; 29/593
(58) Field of Search ............................... 29/825, 592.1, 29/593

(56) References Cited

U.S. PATENT DOCUMENTS

| | | | | |
|---|---|---|---|---|
| 4,096,048 A | * | 6/1978 | Matsumoto et al. | 204/424 |
| 4,208,265 A | * | 6/1980 | Hori et al. | 204/424 |
| 4,284,486 A | * | 8/1981 | Shinohara et al. | 204/424 |
| 4,292,157 A | * | 9/1981 | Wakizaka et al. | 204/424 |
| 5,310,471 A | * | 5/1994 | Markle et al. | 156/146 |
| 5,804,783 A | * | 9/1998 | Breed | 200/61.45 R |

* cited by examiner

*Primary Examiner*—Timothy V. Eley
*Assistant Examiner*—Alvin J Grant
(74) *Attorney, Agent, or Firm*—Oppenheimer, Wolff & Donnelly, LLP

(57) ABSTRACT

A deign method to eliminate any micro-openings in a very high pressure sensor assembly is provided. The method involves sealing an elongated silicon pressure sensor into a fitting using an alloy and glass based materials. The materials are selected so that their thermal coefficients of expansion are progressively increasing relative to the silicon sensing element. This allows strong bonding among the materials, thereby minimizing any pressure leakage.

20 Claims, 2 Drawing Sheets

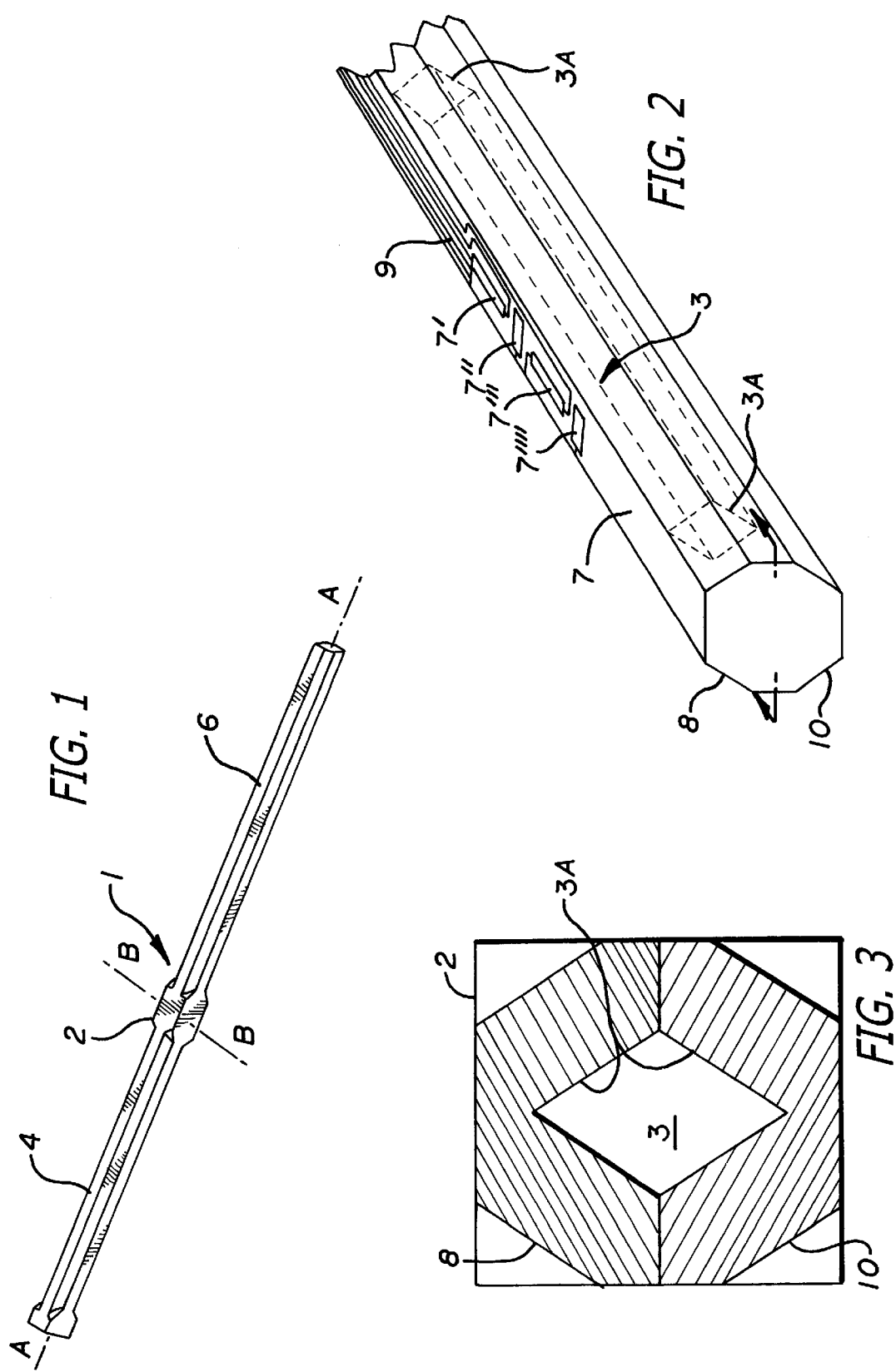

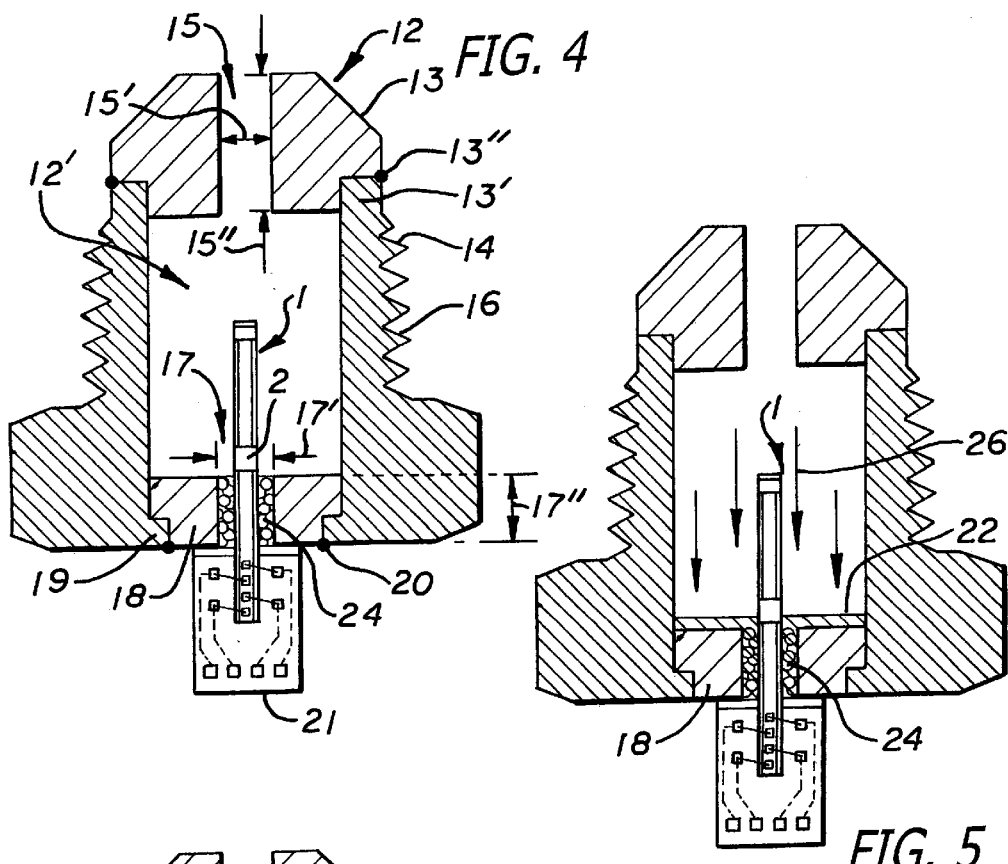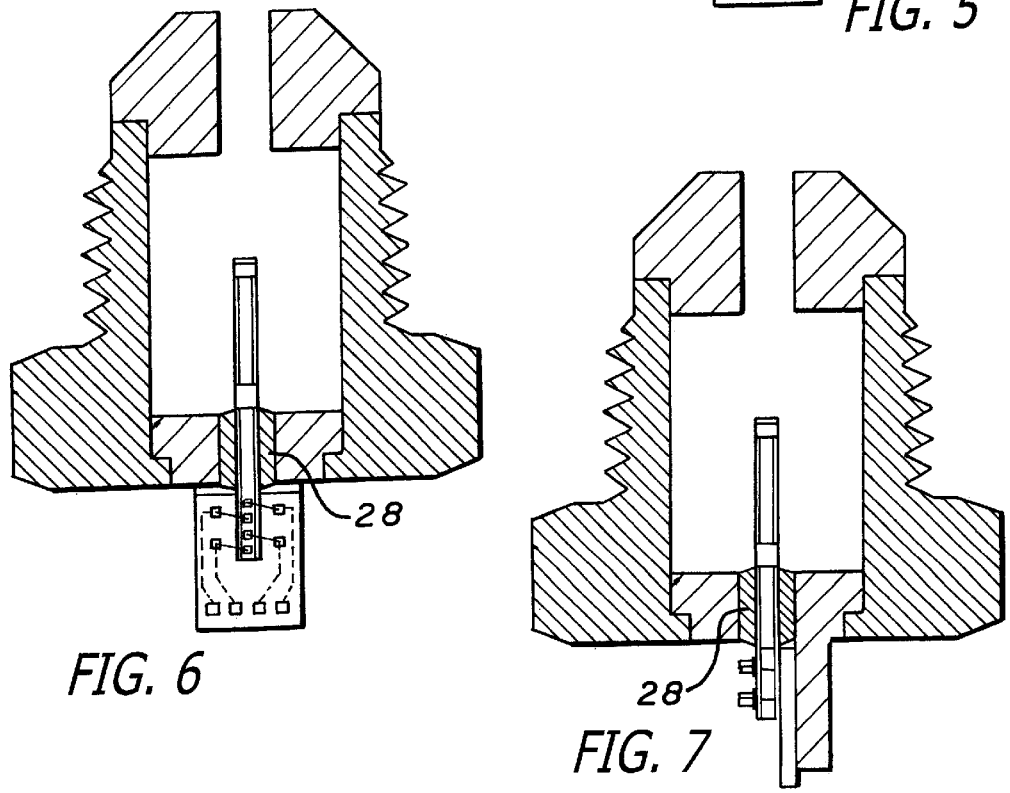

VERY HIGH PRESSURE MINIATURE SENSING AND MOUNTING TECHNIQUE

CROSS-REFERENCE TO RELATED APPLICATIONS

This application is related to U.S. patent application Ser. No. 09/125,775.

BACKGROUND OF THE INVENTION

1. Field of Invention

The present invention relates generally to a method of forming a pressure tight sensor housing assembly so as to eliminate pressure "leakage".

2. Description of the Related Art

As set forth in the patent application cited above, in principle, a pressure sensor consists of a spring element (measuring element) and a measurement (sensor) device. Combined together as a unit, the measuring element and the measurement device can be used to provide pressure measurements. Commercially available pressure sensors can employ membranes or diaphragms as spring elements, along with piezo-resistive resistors to provide a signal representing the deflection of the membrane or diaphragm. Spring elements as membranes are unfavorable at high pressures because they are sensitive to effects related to the clamping in a substrate with a transition to materials having an unequal modulus of elasticity. The stress detected in such membranes will be a combination of compressive and tensile stresses. If the tensile stresses becomes sufficiently high, a break can occur. Typically, the signals of the stresses in membranes and/or sensors are linear functions of pressure. However, large deformations in membranes/sensors will cause non-linear stress to pressure signals.

One of the advantages in the sensor of U.S. patent application Ser. No. 09/125,775 (shown in FIGS. 1–3 of the present drawings) is that the geometry of the measuring element serves to overcome the aforementioned shortcomings. Additionally, by using micromechanical manufacturing techniques, it is possible to produce measuring elements according to the invention with very small dimensions. Producing very small dimension measuring elements are particularly advantages for high-pressure measurements. Also, the geometry of the measuring element or sensor is advantageous because the axial length of the sensor is an order of a magnitude times its lateral length, thereby making mounting, integrating and/or packaging of the sensor more practical.

In a typical embodiment, a sensor is enclosed in a sensor housing assembly for use in high pressure applications, including measuring pressures in a diesel fuel injection system. Typically at very high pressures of the order of 30,000 psi (approximately 2200 atmospheric pressures) and at high temperatures, the housing assembly should aid the sensor in providing accurate pressure measurements. Thus, these accurate pressure measurements that can be provided by the sensor, are achieved if the housing assembly is sufficiently pressure tight. That is, there should be no "leakage" in pressure due to porosities in the sensor assembly.

BRIEF SUMMARY OF THE INVENTION

Accordingly, it is an object of this invention to provide a method for incorporating a sensor within a sensor housing assembly.

It is another object of this invention to provide a method for incorporating a sensor within a housing assembly to withstand very high pressures and high temperatures.

It is yet another object of this invention to provide a method for incorporating a sensor within a pressure tight housing assembly.

These and other objects and advantages are attained by placing the elongated sensor in a pressure tight enclosure. In accordance with one illustrative embodiment of the invention, a KOVAR alloy fitting forms a portion of the assembly.

Typically, KOVAR alloy is used for metallic parts which make hermetic seals with glass based and ceramic based materials in view of its thermal expansion properties which are compatible with those of glass or ceramic based materials. The interface between the KOVAR alloy and the sensor may be a glass sleeve in one embodiment. In a preferred embodiment a glass paste is used. This combined KOVAR-glass-sensor system is heated to a temperature of approximately four hundred degrees Celsius. Subsequently, a final sealer is applied to this system. In the present embodiment, the sealer is an epoxy resin which is applied to this system by means of a high pressure gas, the gas being pressurized at about five thousand psi (approximately 360 atmospheric pressures) of air pressure for about thirty minutes. During the curing phase the combined KOVAR-glass-sensor-resin system is cured at approximately 150 degrees Celsius for about one hour. After this method was employed, the sensor system is able to accurately measure pressures of about thirty thousand psi (approximately two thousand and two hundred atmospheric pressures) at various temperatures for a long duration. Additionally, no further "micro-leaks" in pressure were observed with this invention.

The total time taken by the process from start to finish is less than about two hours.

From a broader standpoint the invention involves sealing a high strength, elongated hollow pressure sensing element into a high strength metal fitting. The metal fitting has a relatively higher thermal coefficient of expansion than the sensor element. An intermediate transitioning member having an opening which may be centrally located is fitted between the metal fitting and the sensing element. The thermal coefficient of expansion of the transition member lies between the thermal coefficients of the sensing element and the metal. The pressure sensing element extends through the opening in the transitioning member. Additionally, a filler or filling element is positioned in the space between the transitioning member and the sensing element. The filler has a thermal coefficient of expansion that lies between the thermal coefficients of the sensing element and the intermediate transitioning member. The combined system or assembly is then heated to thermally bond and seal the sensing element in place within the assembly. Subsequently additional sealing material such as an epoxy may be applied under pressure, and then cured to seal any possible residual openings in the assembly. There are at least two means to avoid failure caused by temperature cycling. The first means is by the gradual transitioning of the thermal coefficients of expansion. The second means is by increased contraction of the outer parts of the fitting versus the inner parts of the fitting upon cooling, thereby producing a squeezing and sealing effect.

The above described and many other features and attendant advantages of the present invention will become apparent from a consideration of the following detailed description when considered in conjunction with the accompanying drawings.

BRIEF DESCRIPTION OF THE DRAWINGS

Detailed description of the preferred embodiment of the invention will be made with reference to the accompanying drawings. FIG. 1 is an isometric view of the measuring element in the sensor system; FIG. 2 is an enlarged perspective view of one end of the measuring element along with the sensor device, the sensor device comprising a wheatstone bridge formed from piezo-resistive elements for detecting transverse and axial displacements;

FIG. 3 is a corresponding cross-sectional view that is obtained from FIG. 1 and FIG. 2, showing the inner cavity of the sensor system;

FIG. 4 depicts an initial stage of the fabrication of the sensor system incorporated in the housing assembly;

FIG. 5 depicts an intermediate stage of the fabrication of the sensor system incorporated in the housing assembly;

FIG. 6 shows the curing stage for the full assembly; and

FIG. 7 is a side view of the sensor system and housing assembly of FIG. 6.

DETAILED DESCRIPTION OF THE PREFERRED EMBODIMENT(S)

This description is not to be taken in a limiting sense, but is merely for the purpose of illustrating the general principles of the invention. The section titles and overall organization of the present detailed description are for the purpose of convenience only and are not intended to limit the present invention.

In the example shown in FIG. 1, an elongate very high pressure sensor comprising a measuring element 1 is presented. In the present embodiment, the measuring element is a silicon pressure sensor of small dimensions with a thermal coefficient of expansion $\alpha_S$ of about $1.4 \times 10^{-6}$ per degree Fahrenheit, or $1.4 \times 10^{-6}$ /° F. Preferably, the longitudinal dimension of the measuring element is of the order of several times and preferably ten times the lateral or transverse dimension. This feature allows the sensor to be inserted into narrow openings. In the present embodiment, the element 1 is about 0.55 inches long, and having height and width of approximately 0.022 inches. The present embodiment shows an octagonal design for the surface of the element. Alternative embodiments include rectangular surfaces. The longitudinal axis for the measuring element is shown as the dotted line marked A—A, whereas the lateral axis is denoted by the dotted line B—B. There is an abutment 2 located along the length of the measuring element. The abutment can be used as a means for separating the top portion 4 and the bottom portion 6, when the element is mounted within a housing assembly.

FIG. 2 shows a perspective view of one end of the measuring element 1, which is further comprised of two parts 8 and 10. These two parts are identical, and together form an internal cavity 3 between the two walls 3A. The cavity 3 does not extend quite to the ends of the measuring element 1 and provides the internal cavity 3. Additionally, the surface 7 on the measuring element 1 is provided with sensor devices 7', 7", 7"', and 7"", from which a number of leads 9 are connected to electronics or measuring circuitry. Preferably, this circuitry can be located on a separate substrate for improved modularity of the housing assembly as shown for example at reference numeral 21 in FIG. 4.

FIG. 3 is a cross-sectional view of FIG. 2, wherein the inner cavity 3 is shown along with the two parts 8 and 10 and the abutment 2.

FIG. 4 shows an initial stage in the formation of a pressure tight, very high pressure sensor assembly. The measuring element 1 is partially positioned within the housing assembly 12. Both the top piece 13 and the bottom piece 13' are metallic and preferably made of steel. The stainless steel material has a relatively high thermal coefficient of linear expansion $\alpha_M$, of approximately $6 \times 10^{-6}$ /° F. The top piece 13 of the housing assembly contains a first opening 15 having a diameter 15' that is smaller than the longitudinal length 15" of the opening. Furthermore, the diameter 15' is greater than the lateral dimension of the measuring element 1, so as to allow the element to be placed inside the assembly 12. A threaded surface portion 14 is formed on the outer surface of the fitting 13'. These threads will mate with a corresponding threaded bore (not shown). The threaded bore would be part of an environment in which the sensor-assembly is to be used for measuring pressure. For example, in one embodiment the surround element may be a diesel fuel injection system.

Enclosed within the housing assembly 12, is a KOVAR alloy based structure 18, which in the present embodiment is in the form of a ring. The KOVAR alloy structure dimensions and shape are such that it can be supported by a shoulder 19 which in the present embodiment is part of the metallic stainless steel element bottom piece 13'. In addition, the KOVAR-metal interface has a weld, as indicated by the solid dot 20. The KOVAR alloy has a relatively lower thermal coefficient of linear expansion $\alpha_K$ (approximately $3.25 \times 10^{-6}$ /° F.) than the stainless steel member, but a higher thermal coefficient of linear expansion than the measuring silicon element 1. The KOVAR structure includes an opening 17 to allow the measuring element 1 to extend through it. The opening 17 has a lateral dimension 17' which is smaller than the longitudinal length 17" in the present embodiment. The lateral dimension of the opening 17 is such that the measuring element 1 can extend through it. Furthermore, a glass based material 24 is positioned in the space between the KOVAR alloy 18 and the measuring element 1. The glass based material 24 in the present embodiment is a glass paste. Alternatively, the glass based material 24 could be a glass sleeve. The glass paste when treated, seals the space between the KOVAR and silicon element, thereby allowing accurate pressure measurements. The glass paste has a relatively lower thermal coefficient of expansion $\alpha_G$ (approximately $1.78 \times 10^{-6}$ /° F.) than the KOVAR alloy, but has a higher thermal coefficient of expansion than the silicon measuring element 1. Thus, in summary, the thermal coefficients of expansions for the various materials that form the very high pressure sensing assembly are related in the following manner, $\alpha_S < \alpha_G < \alpha_K < \alpha_M$. In the present embodiment, the top portion 4 of the measuring element 1 is positionally located in the pressure measuring environment, or the chamber 12', whereas the bottom portion 6 of the sensor 1 is positionally located outside the pressurized environment, where it interfaces with electronic circuitry 21.

A ceramic substrate circuit board 21 is mounted on the housing assembly 12. The piezo-resistive bridge elements 7', 7", 7"', 7"" are connected to the appropriate terminals on the substrate, so as to deliver a linear output electrical signal representing a pressure differential (between the pressure to be measured and the internal cavity 3 pressure) to an external recording device or a display terminal.

In the first stage as depicted in FIG. 4, the combined assembly is heated to about four hundred degrees Celsius, depending on the type of glass 24, so as to hold and seal the sensor 1 in place.

In the second stage as shown in FIG. 5, an epoxy resin 22 surrounding the sensor 1 is placed over the KOVAR-glass system. Alternatively, any polyamid or curable polymer can be used instead of an epoxy. In the present embodiment, the epoxy resin is an optical epoxy EPO-TEK 377, manufactured by Epoxy Technology, Inc. (Massachusetts). It is a moderately viscous epoxy with excellent handling characteristics and a long pot life at room temperatures. It is also used as a coating for materials that are subjected to high temperatures. The epoxy is subject to high pressure gas 26 at a pressure of about five thousand (psi) for about thirty minutes so that it is impregnated into and seals any micro-openings in the glass seal 24.

In the third stage, as shown in FIG. 6, the epoxy is cured at one hundred and fifty degrees Celsius for about one hour so as to strongly adhere the glass paste to the epoxy. The shaded portion 28 depicts the strong bond formed between the glass 24 and the epoxy 22 preventing any micro-leaks in pressure, thereby allowing accurate pressure measurements.

In FIG. 7, a side view of the sensor-assembly system is shown along with the shaded depiction 28 of the strong seal formed by the glass 24 and epoxy 22.

After this stage, it is observed that the assembly can hold pressures of about thirty thousand (psi) at various temperatures for a substantial amount of time. Additionally, no "micro-leaks" in pressure are observed. This is due to the design of the housing assembly in terms of the physical properties of the materials, such as the thermal coefficients of expansions. Basically, a strong seal is generated by allowing a progressive gradation of the thermal coefficients of expansion for the materials. On cooling, such a gradation in the thermal coefficients produces a squeezing effect that strengthens and enhances the seal.

In closing, it is noted that specific illustrative embodiments of the invention have been disclosed herein above. However, it is to be understood that the invention is not limited to these specific embodiments. Thus, by way of example and not of limitation, the sensor element could be of a different shape, other than elongated, and certain principles of the invention involving thermal coefficients of expansion of mounting and sealing arrangements would still be applicable. Also, the precise materials need not be used in each case as long as the function and, design concepts are followed. With respect to the claims, it is applicant's intention that the claims not be interpreted in accordance with the sixth paragraph of 35 U.S.C. § 112 unless the term "means" is used followed by a functional statement.

What is claimed is:

1. A method of forming a pressure tight, very high pressure sensor assembly comprising the steps of:
   forming a stainless steel metal fitting with an opening;
   mounting a transition ring to the fitting to extend around the opening;
   inserting an elongated silicon pressure sensing element into said opening;
   providing glass based material in the opening between the sensing element and the transition ring to form an assembly;
   heating the assembly to a first elevated temperature to bond the glass based material to the sensing element and to the transition ring;
   applying a polymer to an area between the transition ring and the sensing element under a predetermined pressure; and
   curing the polymer by the application of a second elevated temperature to seal any possible micro-openings that could lead to pressure leakage.

2. An assembly as defined in claim 1, wherein said transition ring and said glass based material have thermal coefficients of expansion between that of stainless steel and silicon.

3. A method of forming a pressure tight, very high pressure sensor assembly comprising the steps of:
   forming a threaded metal fitting with an opening;
   mounting an alloy transition ring to the fitting to extend around the opening;
   inserting a sensing element into said opening;
   providing a bonding material in the opening between the sensing element and the alloy transition ring to form an assembly;
   heating the assembly to a first elevated temperature to bond the material to the sensing element and to the alloy;
   applying a polymer to the alloy around the sensing element under a predetermined pressure; and
   curing the polymer by the application of a second elevated temperature to seal any possible micro-openings that could lead to pressure leakage.

4. The method as claimed in claim 3, wherein the sensing element is a silicon based pressure sensor.

5. The method as claimed in claim 3, wherein the transition ring is made of KOVAR.

6. The method as claimed in claim 3, wherein the first elevated temperature is about four hundred degrees Celsius.

7. The method as claimed in claim 3, wherein the polymer is an epoxy resin.

8. The method as claimed in claim 3, wherein the second elevated temperatures is about one hundred and fifty degrees Celsius.

9. A method of forming a pressure tight, very high pressure sensor assembly comprising the steps of:
   selecting a fitting with an opening and having a first thermal coefficient of expansion;
   attaching a transition member with a second thermal coefficient of expansion to the fitting and around the opening;
   inserting a sensing element having a fourth thermal coefficient of expansion into the opening, whereby creating a space between the sensing element and the transition member;
   filling the space between the sensing element and the transition member with a filler having a third thermal coefficient of expansion, to form an assembly;
   heating the assembly to a first elevated temperature to bond the filler to the sensing element and the transition member; and
   said method including selecting said filler, said transition member and said fitting to have progressively increased thermal coefficients of expansion, as compared with said sensing element.

10. The method according to claim 9, wherein the transition member is made of an alloy.

11. The method according to claim 10, wherein the alloy is made of KOVAR.

12. The method according to claim 9, wherein the filler is made of glass.

13. The method according to claim 9, further including the step of applying a polymer to the alloy around the sensing element under a predetermined pressure.

14. The method according to claim 13, wherein the predetermined pressure is about six thousand (psi).

15. The method according to claim 13, further including the step of curing the polymer by the application of a second elevated temperature to seal any possible micro-openings that could lead to pressure leakage.

16. The method according to claim 15, wherein the polymer is an epoxy resin.

17. The method according to claim 15, wherein the second elevated temperature is about one hundred and fifty degrees Celsius.

18. The method according to claim 9, wherein the sensing element is made of silicon.

19. The method according to claim 9, wherein the fitting is made of metal.

20. The method according to claim 19, wherein the metal is stainless steel.

* * * * *